United States Patent
Chiang et al.

(10) Patent No.: US 6,794,843 B2
(45) Date of Patent: Sep. 21, 2004

(54) VENTILATOR HAVING A MUTING DEVICE

(76) Inventors: Chao-Cheng Chiang, 335, Ta Lin Rd., Ta Ya Hsiang, Taichung Hsien (TW); Chi-Hsiung Chiang, 335, Ta Lin Rd., Ta Ya Hsiang, Taichung Hsien (TW)

( * ) Notice: Subject to any disclaimer, the term of this patent is extended or adjusted under 35 U.S.C. 154(b) by 107 days.

(21) Appl. No.: 10/336,772

(22) Filed: Jan. 2, 2003

(65) Prior Publication Data

US 2004/0130279 A1 Jul. 8, 2004

(51) Int. Cl.[7] .............................................. H02P 7/622
(52) U.S. Cl. ....................... 318/781; 318/783; 318/471; 318/434; 388/903; 388/934
(58) Field of Search ................................ 318/727, 772, 318/778, 779, 781–783, 794, 434, 471–473; 388/903, 934

(56) References Cited

U.S. PATENT DOCUMENTS

| | | | | |
|---|---|---|---|---|
| 3,761,792 A | * | 9/1973 | Whitney et al. | ............ 318/788 |
| 4,196,462 A | * | 4/1980 | Pohl | ............................. 361/33 |
| 4,200,829 A | * | 4/1980 | Pohl | ............................. 318/782 |
| 4,280,332 A | * | 7/1981 | Khan et al. | .................... 62/156 |
| 4,823,067 A | * | 4/1989 | Weber | .......................... 318/799 |
| 4,843,295 A | * | 6/1989 | Thompson et al. | .......... 318/786 |
| 5,049,801 A | * | 9/1991 | Potter | ........................... 318/785 |
| 6,616,416 B1 | * | 9/2003 | Tolbert, Jr. | ................... 417/45 |

* cited by examiner

Primary Examiner—Bentsu Ro

(57) ABSTRACT

A ventilator having a muting device includes a central processing unit, and a fan motor. The fan motor is connected to a start capacitor which is electrically connected to a temperature sensing circuit which is electrically connected to the central processing unit, so that the start capacitor can indicate a signal on a panel of the ventilator, so as to control a rotational speed of the fan motor. Thus, the operation state of each part of the ventilator is indicated on the panel of the ventilator clearly to facilitate inspection of the user, so that the user can control the rotational speed of the fan motor to a proper value, thereby reducing the noise during operation, so as to achieve a muting effect.

12 Claims, 2 Drawing Sheets

VENTILATOR HAVING A MUTING DEVICE

BACKGROUND OF THE INVENTION

1. Field of the Invention

The present invention relates to a ventilator having a muting device, a and more particularly to a ventilator having a muting device, wherein the operation state of each part of the ventilator is indicated on the panel of the ventilator clearly so as to facilitate inspection of the user, so that the user can control the rotational speed of the fan motor to a proper value, thereby reducing the noise during operation, so as to achieve a muting effect.

2. Description of the Related Art

The ventilator usually comprises a fan motor that is operated at a high rotational speed, so as to drain the oily smoke contained in the kitchen outward, thereby achieving the ventilating effect. However, when the rotational speed of the fan motor is increased, the temperature of the fan motor is increased relatively, so that the fan motor operated at a high rotational speed is easily worn out during a long-term utilization due to the high temperature.

A conventional ventilator in accordance with the prior art comprises a variable resistor to adjust the rotational speed of the fan motor by variation of the resistance of the variable resistor. However, the current is consumed by the variable resistor, thereby easily incurring overheat due to the improper variation of the resistance of the variable resistor, and thereby decreasing the lifetime of the fan motor. In addition, the conventional ventilator cannot achieve a muting effect.

SUMMARY OF THE INVENTION

The present invention has arisen to mitigate and/or obviate the disadvantage of the conventional ventilator.

The primary objective of the present invention is to provide a ventilator having a muting device, wherein the operation state of each part of the ventilator is indicated on the panel of the ventilator clearly, thereby facilitating inspection of the user, so that the user can control the rotational speed of the fan motor to a proper value, thereby reducing the noise during operation, so as to achieve a muting effect.

Another objective of the present invention is to provide a ventilator having a muting device, wherein the temperature sensing circuit can be used to detect the temperature of the fan motor during operation, and can feed back the detected temperature values to the central processing unit, so that the central processing unit can be used to control the rotational speed of the fan motor to a proper value, so as to reduce the output power and the rotational speed of the fan motor appropriately, thereby achieving a muting effect.

A further objective of the present invention is to provide a ventilator having a muting device, wherein the abnormal operation indication lamps on the panel of the ventilator are provided with different patterns or figures, so as to indicate the abnormal operation state of each part of the ventilator, so that the user can understand the related messages of each part of the ventilator easily and conveniently, thereby facilitating inspection and maintenance of the parts of the ventilator.

A further objective of the present invention is to provide a ventilator having a muting device, wherein the temperature sensing circuit can be used to detect the temperature of the fan motor during operation, and can feedback the detected temperature values to the central processing unit, so that the central processing unit can be used to control the rotational speed of the fan motor to a proper value, so as to reduce the output power and the rotational speed of the fan motor appropriately, thereby preventing the fan motor from being burnt out due to overheat.

A further objective of the present invention is to provide a ventilator having a muting device, wherein the temperature sensing circuit can detect the temperature of the fan motor during operation, and can reduce the rotational speed of the fan motor appropriately by using a voltage drop capacitor, without needing to use a variable resistor to adjust the rotational speed of the fan motor, thereby preventing from incurring overheat due to the improper variation of the resistance of the variable resistor, so as to enhance the lifetime of the fan motor.

A further objective of the present invention is to provide a ventilator having a muting device, wherein the temperature sensing circuit can be used to detect the temperature of multiple fan motors during operation, thereby enhancing the versatility of the ventilator.

In accordance with the present invention, there is provided a ventilator having a muting device, comprising a central processing unit, and a fan motor, wherein:

the fan motor is connected to a start capacitor;

the start capacitor is electrically connected to a temperature sensing circuit; and the temperature sensing circuit is electrically connected to the central processing unit, so that the start capacitor can indicate a signal on a panel of the ventilator, so as to control a rotational speed of the fan motor.

Further benefits and advantages of the present invention will become apparent after a careful reading of the detailed description with appropriate reference to the accompanying drawings.

DETAILED DESCRIPTION OF THE INVENTION

Figure 1:
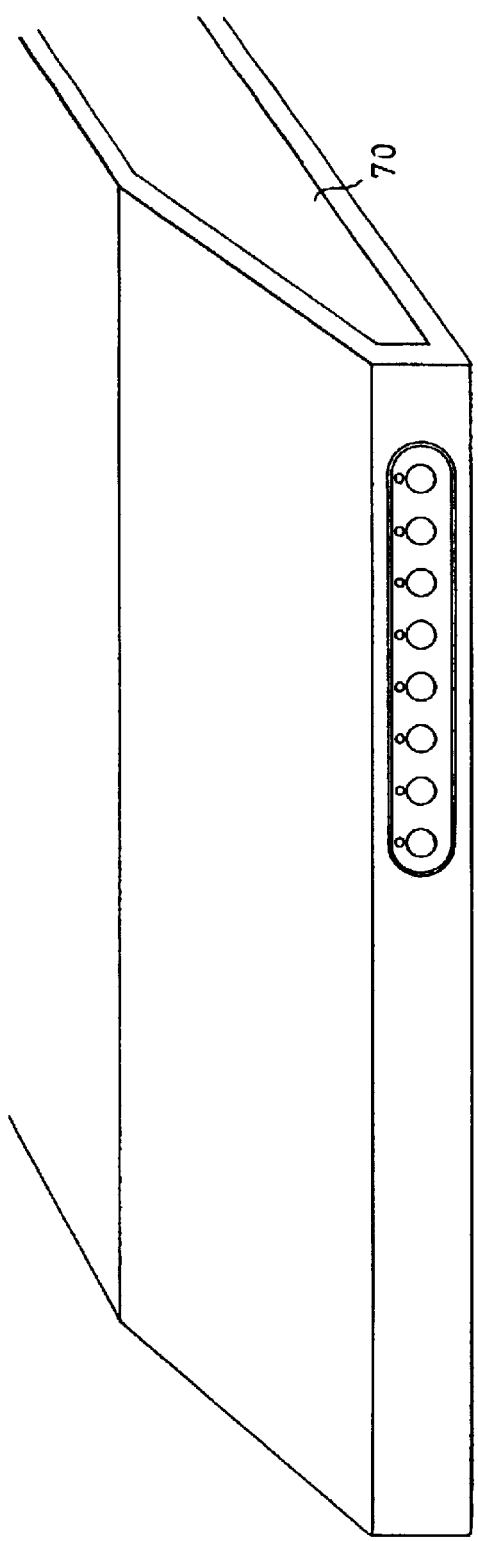
FIG. 1 is a schematic perspective view of a ventilator having a muting device in accordance with a preferred embodiment of the present invention.
Figure 1A:
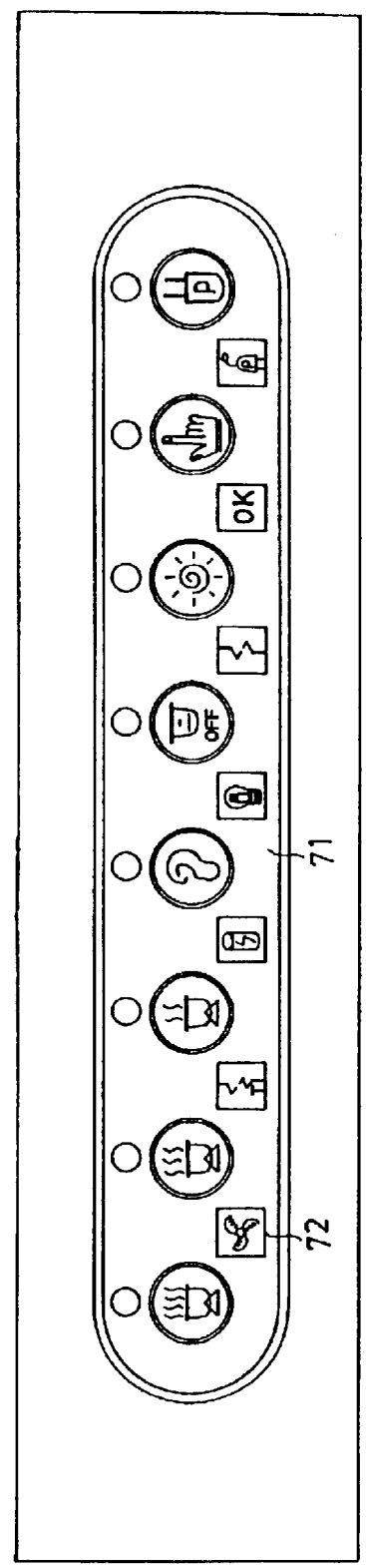
FIG. 1A is a partially plan enlarged view of the ventilator having a muting device as shown in FIG. 1.
Figure 2:
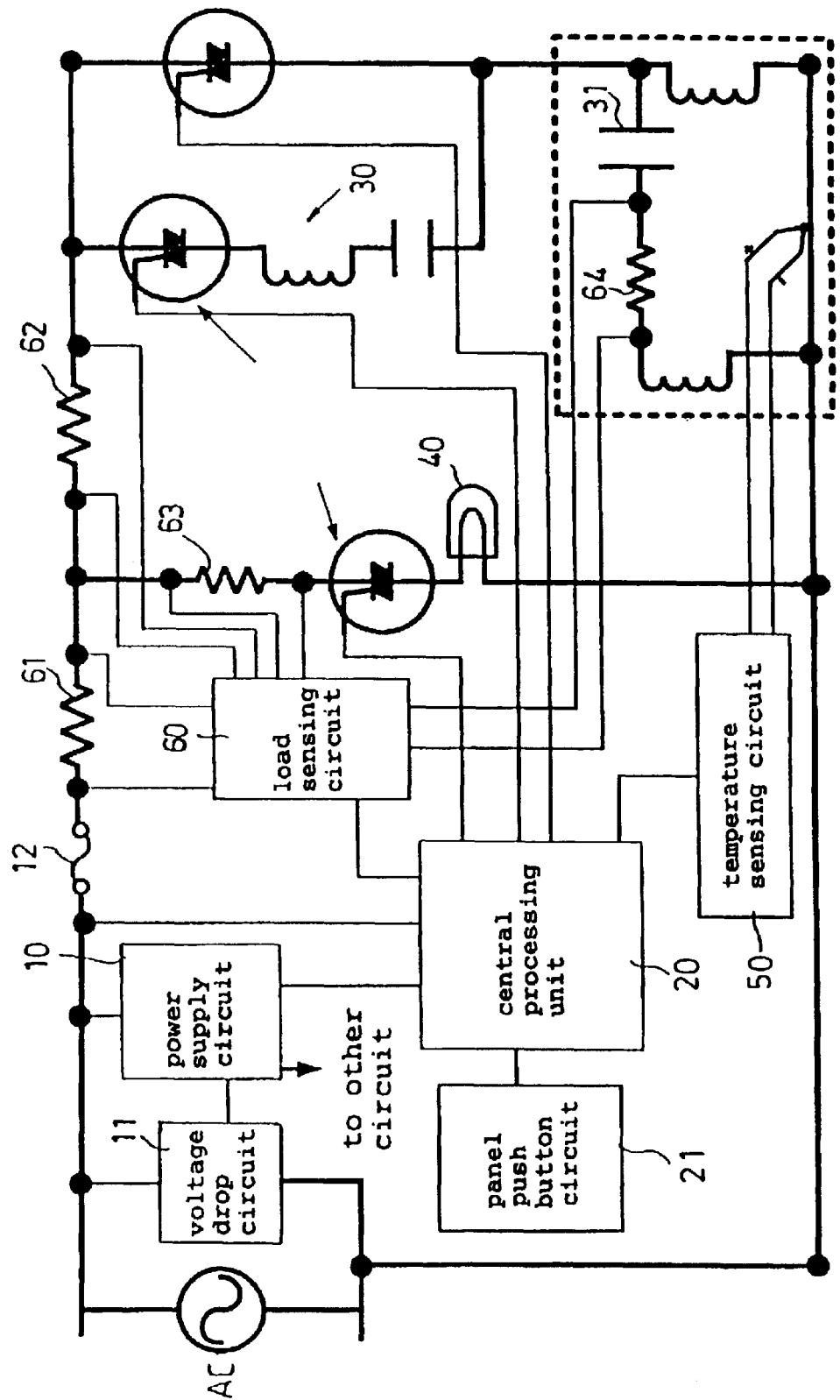
FIG. 2 is a schematic circuit diagram of the ventilator having a muting device in accordance with the preferred embodiment of the present invention.

Referring to FIGS. 1, 1A and 2, a ventilator having a muting device in accordance with a preferred embodiment of the present invention comprises a power supply circuit 10, a central processing unit (CPU) 20, a fan motor 30, a temperature sensing circuit 50, and a load sensing circuit 60.

The power supply circuit 10 is connected to a voltage drop circuit 11, so as to convert the alternating current power of the power supply circuit 10 into a direct current power supply. The power supply circuit 10 is connected to a safety member 12, such as a fuse.

The central processing unit 20 is connected to a panel push button circuit 21, so that the central processing unit 20 is controlled by the panel push button circuit 21. The central processing unit 20 is electrically connected to the power supply circuit 10. The central processing unit 20 can be used to control the fan motor 30 of the ventilator 70. The central processing unit 20 is connected to an illumination lamp 40.

The fan motor 30 is connected to a start capacitor 31.

The temperature sensing circuit 50 is electrically connected to the start capacitor 31, and is electrically connected to the central processing unit 20, so that the start capacitor 31 can indicate a proper signal on the panel 71 of the ventilator 70, so as to control the rotational speed of the fan motor 30 appropriately. Thus, the temperature sensing circuit 50 can be used to detect the temperature of the fan motor 30, and can feed back the detected values to the central processing unit 20, so that the central processing unit 20 can be used to control the rotational speed of the fan motor 30.

The load sensing circuit 60 is electrically connected to the power supply circuit 10, the central processing unit 20, the fan motor 30, the illumination lamp 40 and the start capacitor 31 respectively. A first sensor 61 is connected between the load sensing circuit 60 and the safety member 12 of the power supply circuit 10. A second sensor 62 is connected between the load sensing circuit 60 and the fan motor 30. A third sensor 63 is connected between the load sensing circuit 60 and the illumination lamp 40. A fourth sensor 64 is connected between the load sensing circuit 60 and the start capacitor 31.

In operation, the central processing unit 20 can be used to control the ventilator 70 efficiently and safely. The user can control the panel 71 of the ventilator 70, to control the central processing unit 20 by the panel push button circuit 21, so that the fan motor 30 of the ventilator 70 is controlled and operated by the program in the inside of the central processing unit 20, so as to drain the oily smoke contained in the kitchen outward, thereby achieving the ventilating effect.

In practice, the panel 71 of the ventilator 70 is provided with a plurality of abnormal operation indication lamps 72, so as to indicate the abnormal operation of the parts of the ventilator 70. In such a manner, when the rotational speed of the fan motor 30 is increased, the temperature of the fan motor 30 is increased relatively, thereby forming an abnormal signal. At this time, the fan motor 30 is connected to the start capacitor 31, and the temperature sensing circuit 50 is electrically connected to the start capacitor 31 and the central processing unit 20. Thus, by control of the soft program of the start capacitor 31 and the central processing unit 20, the abnormal signal is indicated on one of the abnormal operation indication lamps 72 of the panel 71 of the ventilator 70, so that the user can control the rotational speed of the fan motor 30 to a proper value and can amend or replace the parts, so as to enhance the lifetime of the ventilator.

In addition, the temperature sensing circuit 50 can be used to detect the temperature of the fan motor 30 during operation, and can feed back the detected temperature values to the central processing unit 20, so that the central processing unit 20 can be used to control the rotational speed of the fan motor 30 to a proper value, so as to reduce the output power and the rotational speed of the fan motor 30 appropriately, thereby achieving a muting effect, and thereby preventing the fan motor 30 from being burnt out due to overheat.

Further, the abnormal signals are indicated on the abnormal operation indication lamps 72 of the panel 71 of the ventilator 70, so that the user can reduce the rotational speed of the fan motor 30 appropriately, without needing to use a variable resistor to adjust the rotational speed of the fan motor 30, thereby preventing from incurring overheat due to the improper variation of the resistance of the variable resistor, so as to enhance the lifetime of the fan motor 30.

Further, the temperature sensing circuit 59 can be used to detect the temperature of multiple fan motors 30 during operation, thereby enhancing the versatility of the ventilator.

On the other hand, in the load sensing circuit 60, the first sensor 61 is connected between the load sensing circuit 60 and the safety member 12, the second sensor 62 is connected between the load sensing circuit 60 and the fan motor 30, the third sensor 63 is connected between the load sensing circuit 60 and the illumination lamp 40, and the fourth sensor 64 is connected between the load sensing circuit 60 and the start capacitor 31.

In such a manner, when the load sensing circuit 60 detects the abnormal operation signal through the first sensor 61, one of the abnormal operation indication lamps 72 on the panel 71 of the ventilator 70 lights, so as to indicate that the safety member 12 is disposed at an abnormal operation state and needs to be inspected and amended.

Alternatively, when the load sensing circuit 60 detects the abnormal operation signal through the second sensor 62, another of the abnormal operation indication lamps 72 on the panel 71 of the ventilator 70 lights, so as to indicate that the fan motor 30 is disposed at an abnormal operation state and needs to be inspected and amended.

Alternatively, when the load sensing circuit 60 detects the abnormal operation signal through the third sensor 63, another of the abnormal operation indication lamps 72 on the panel 71 of the ventilator 70 lights, so as to indicate that the illumination lamp 40 is disposed at an abnormal operation state and needs to be inspected and amended.

Alternatively, when the load sensing circuit 60 detects the abnormal operation signal through the fourth sensor 64, another of the abnormal operation indication lamps 72 on the panel 71 of the ventilator 70 lights, so as to indicate that the start capacitor 31 is disposed at an abnormal operation state and needs to be inspected and amended.

In addition, the abnormal operation indication lamps 72 on the panel 71 of the ventilator 70 are provided with different patterns or figures, so as to indicate the abnormal operation state of each part of the ventilator 70, so that the user can understand the related messages of each part of the ventilator 70 easily and conveniently, thereby facilitating inspection and maintenance of the parts of the ventilator 70.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A ventilator having a muting device, comprising a central processing unit, and a fan motor, wherein:

the fan motor is connected to a start capacitor;

the start capacitor is electrically connected to a temperature sensing circuit; and the temperature sensing circuit is electrically connected to the central processing unit, so that the start capacitor can indicate a signal on a panel of the ventilator, so as to control a rotational speed of the fan motor.

2. The ventilator having a muting device in accordance with claim 1, further comprising a power supply circuit connected to a voltage drop circuit, so as to convert an alternating current power of the power supply circuit into a direct current power supply.

3. The ventilator having a muting device in accordance with claim 2, wherein the central processing unit is electrically connected to the power supply circuit.

4. The ventilator having a muting device in accordance with claim 2, further comprising a load sensing circuit electrically connected to the power supply circuit, and a sensor connected between the load sensing circuit and the power supply circuit.

5. The ventilator having a muting device in accordance with claim 1, wherein the central processing unit is connected to a panel push button circuit, so that the central processing unit is controlled by the panel push button circuit.

6. The ventilator having a muting device in accordance with claim 1, wherein the central processing unit is used to control the fan motor.

7. The ventilator having a muting device in accordance with claim 1, wherein the central processing unit is connected to an illumination lamp.

8. The ventilator having a muting device in accordance with claim 7, further comprising a load sensing circuit electrically connected to the illumination lamp, and a sensor connected between the load sensing circuit and the illumination lamp.

9. The ventilator having a muting device in accordance with claim 1, further comprising a load sensing circuit electrically connected to the central processing unit, the fan motor and the start capacitor respectively.

10. The ventilator having a muting device in accordance with claim 9, further comprising a sensor connected between the load sensing circuit and the fan motors.

11. The ventilator having a muting device in accordance with claim 9, further comprising a sensor connected between the load sensing circuit and the start capacitor.

12. The ventilator having a muting device in accordance with claim 1, wherein the panel of the ventilator is provided with a plurality of abnormal operation indication lamps.

* * * * *